United States Patent
Danenberg et al.

(10) Patent No.: US 12,251,054 B2
(45) Date of Patent: Mar. 18, 2025

(54) BUTTER PRODUCTS AND METHODS OF FORMING AND PACKAGING SAME

(71) Applicant: Land O'Lakes, Inc., Arden Hills, MN (US)

(72) Inventors: Benjamin R. Danenberg, White Bear Lake, MN (US); Richard Dinesen, Woodbury, MN (US)

(73) Assignee: Land O'Lakes, Inc., Arden Hills, MN (US)

( * ) Notice: Subject to any disclaimer, the term of this patent is extended or adjusted under 35 U.S.C. 154(b) by 0 days.

(21) Appl. No.: 15/440,994

(22) Filed: Feb. 23, 2017

(65) Prior Publication Data

US 2017/0238572 A1 Aug. 24, 2017

Related U.S. Application Data (60) Provisional application No. 62/299,350, filed on Feb. 24, 2016.

(51) Int. Cl.
*A23C 15/18* (2006.01)
*A01J 21/02* (2006.01)
(Continued)

(52) U.S. Cl.
CPC .............. *A47J 9/002* (2013.01); *A01J 21/02* (2013.01); *A23C 15/12* (2013.01); *A23P 30/20* (2016.08)

(58) Field of Classification Search
CPC .. A01J 21/02; A01J 21/00; A01J 17/00; A01J 15/00; A01J 15/10; A01J 15/12;
(Continued)

(56) References Cited

U.S. PATENT DOCUMENTS

| 44,342 A | 9/1864 | Sawyer |
|---|---|---|
| 547,721 A | 10/1895 | Hazel |

(Continued)

FOREIGN PATENT DOCUMENTS

| CN | 301699053 | 10/2011 |
|---|---|---|
| CN | 104378996 A | 2/2015 |

(Continued)

OTHER PUBLICATIONS

Cold Extrusion of Butter. SPX. Jul. 2012. Retrieved from: <https://www.spxflow.com/en/assets/pdf/GS_cold_extrusion_of_butter_07_12_GB.pdf>.*

(Continued)

*Primary Examiner* — Viren A Thakur
*Assistant Examiner* — Ashley Axtell
(74) *Attorney, Agent, or Firm* — Dorsey & Whitney LLP (57) ABSTRACT

Methods involve packaging butter sticks by adding unformed butter to an extruder, where the extruder shapes the butter into defined dimensions, cutting the extruded butter at a desired length to form butter sticks, cooling the butter sticks, and flow-wrapping the cooled butter sticks within an adhesive film. Systems for packaging butter sticks involve an extruder, a cutting device, a cooling device and a flow-wrapping device, where the extruder shapes unformed butter into defined dimensions, the cutting device slices the extruded butter into butter sticks, the cooling device increases a firmness level of the butter sticks, and the flow-wrapping device packages the butter sticks within a sealed, adhesive film. The extruder, the cutting device, the cooling device and the flow-wrapping device may be connected.

9 Claims, 1 Drawing Sheet

(51) Int. Cl.
  *A23C 15/12* (2006.01)
  *A23P 30/20* (2016.01)
  *A47J 9/00* (2006.01)
(58) Field of Classification Search
  CPC ..... A23C 15/00; A23C 15/12; B29C 47/0016;
       B29C 47/8815; B29C 47/90; B29C
       47/0019; B29C 47/905; B29C 47/88;
       A47J 9/002; A23P 30/20
  USPC .................................................. 426/530, 531
  See application file for complete search history.

(56) References Cited

U.S. PATENT DOCUMENTS

| | | | |
|---|---|---|---|
| 1,690,784 A * | 11/1928 | Hilgers ................... | A01J 21/02 425/207 |
| 1,807,458 A * | 5/1931 | Weland ................... | A01J 21/02 426/663 |
| 1,952,698 A | 3/1934 | Willem | |
| 2,481,691 A * | 9/1949 | Schaub ................... | A01J 21/02 425/145 |
| 2,593,606 A | 4/1952 | Price | |
| 2,841,811 A | 7/1958 | Carroll | |
| 2,972,407 A | 2/1961 | Taylor | |
| 3,017,275 A * | 1/1962 | Coulter .................. | A23C 15/02 426/581 |
| 3,071,476 A | 1/1963 | Werft et al. | |
| 3,175,917 A | 3/1965 | Sivert | |
| 3,267,512 A | 8/1966 | Wiley | |
| D206,429 S | 12/1966 | Eckelman et al. | |
| 3,324,550 A | 6/1967 | Wilsey | |
| 3,324,551 A * | 6/1967 | Muilk ..................... | A01J 15/12 426/519 |
| 3,410,699 A * | 11/1968 | Peters ..................... | A01J 19/00 425/385 |
| 3,458,268 A | 7/1969 | Wozab et al. | |
| 3,889,448 A * | 6/1975 | Russell ................... | A01J 21/02 425/575 |
| 3,939,522 A | 2/1976 | Shimizu | |
| 3,976,796 A | 8/1976 | Peters | |
| 4,149,815 A | 4/1979 | Kawam | |
| 4,215,104 A | 7/1980 | David et al. | |
| 4,866,806 A | 9/1989 | Bedford | |
| D310,130 S | 8/1990 | van | |
| D330,149 S | 10/1992 | Weimer | |
| 5,312,197 A | 5/1994 | Abramson | |
| D361,077 S | 8/1995 | Jamison | |
| D372,486 S | 8/1996 | Morris | |
| 5,776,533 A | 7/1998 | Okamoto et al. | |
| 5,855,937 A | 1/1999 | Okamoto et al. | |
| D411,111 S | 6/1999 | Damion et al. | |
| 6,168,434 B1 | 1/2001 | Boehm-van | |
| D506,587 S | 6/2005 | Armaly | |
| D639,929 S | 6/2011 | Barford | |
| D659,470 S | 5/2012 | Narwankar et al. | |
| 8,584,686 B2 | 11/2013 | Polanish | |
| 8,776,729 B2 | 7/2014 | Koo et al. | |
| D742,491 S | 11/2015 | Yamaguchi | |
| D748,770 S | 2/2016 | Hanna | |
| D749,203 S | 2/2016 | Amico et al. | |
| D760,886 S | 7/2016 | Peterson et al. | |
| D768,946 S | 10/2016 | Anderson | |
| D784,651 S | 4/2017 | Loacker | |
| D792,193 S | 7/2017 | Ullbors | |
| D836,881 S | 1/2019 | Raub | |
| D899,726 S | 10/2020 | Burger et al. | |
| D918,526 S | 5/2021 | Cody et al. | |
| D954,386 S | 6/2022 | Cody et al. | |
| 2003/0017248 A1 | 1/2003 | Gray | |
| 2003/0082254 A1 | 5/2003 | Shorey | |
| 2003/0126831 A1 * | 7/2003 | Altvater ................. | A01J 21/02 53/122 |
| 2005/0123663 A1 * | 6/2005 | White ..................... | A01J 21/02 426/518 |
| 2008/0306598 A1 | 12/2008 | Hansen et al. | |
| 2009/0190866 A1 * | 7/2009 | Hughes .................. | B65D 75/44 383/207 |
| 2012/0024887 A1 * | 2/2012 | Heinze .................. | A47G 19/183 222/1 |
| 2012/0040078 A1 | 2/2012 | Narwankar et al. | |
| 2012/0294663 A1 * | 11/2012 | Papavero ............... | A47G 19/18 401/52 |
| 2014/0182830 A1 * | 7/2014 | Jang ........................ | F28F 21/02 165/185 |
| 2015/0274409 A1 | 10/2015 | Nachbagauer et al. | |

FOREIGN PATENT DOCUMENTS

| | | | |
|---|---|---|---|
| EP | 0908092 A2 * | 4/1999 | |
| FR | 2690310 A1 * | 10/1993 | ............. A01J 15/12 |
| GB | 190609218 A * | 6/1907 | |
| JP | 03251142 A * | 11/1991 | ............. A23C 15/00 |
| JP | 07023709 A * | 1/1995 | |
| JP | H08322413 A | 12/1996 | |
| RU | 2131097 C1 * | 5/1999 | |
| WO | 2013190265 A1 | 12/2013 | |

OTHER PUBLICATIONS

Krause et al. The Effect of Refridgerated and Frozen Storage on Butter Flavor and Texture. American Dairy Science Association. 2008. Retrieved from: <https://pubag.nal.usda.gov/download/15684/PDF>.*
FR 2690310 Espacenet Translation.*
Quora. Jun. 11, 2012. What is the Standard Weight of a Stick of Butter in the United States. Retrieved from URL: <https://www.quora.com/What-is-the-standard-weight-of-a-stick-of-butter-in-the-United-States>.*
Kehinde Adedeji Adekola. Influence of Food Extruder Die on Dimensions of Extruded Products Expansion. Oct. 2014. Retrieved from URL: <http://watchpub.org/jaast/issues/2014/october/pdf/Adekola.pdf>.*
BOC Freezing and Cooling. 2011. Retrieved from Internet URL: <https://www.boc-gas.com.au/en/images/BOC%20Freezing%20and%20Cooling%20brochure_tcm351-68091.pdf>.*
Fennema. Cryogenic Freezing of Foods. Plenum Press. 1978. Retrieved from Internet URL: <https://link.springer.com/content/pdf/10.1007/978-1-4613-4039-3_89.pdf>.*
Handbook of Food Preservation. Second Edition. CRC Press. 2007. http://www.cold.org.gr/library/downloads/Docs/Handbook%20of%20Food%20Preservation.PDF.*
Nahid et al. Modelling the Freezing of Butter. International Journal of Refrigeration. vol. 31, Issue 1, Jan. 2008. pp. 152-160. Retrieved from Internet URL: <https://www.sciencedirect.com/science/article/pii/S0140700707001491>.*
Jeremiah. (1996). Freezing Effects on Food Quality. Boca Raton: CRC Press, https://doi.org/10.1201/9780203755495.*
RU 2131097 Espacenet Translation.*
JP 03251142 Espacnet Translation.*
JP 07023709 Espacenet Translation.*
JP 1988012247 WIPO Translation ( JPS6312247A translation).*
EP 0908092 Espacenet Translation.*
"Guide to Flow Wrapping", Bosch Packaging Technology, Inc., First Edition, 2011, 30 pages.
"Cold Feat: Choosing the Right Freezing Technology for Your Production Line", White Paper, Dr. Chris Kennedy, downloaded from http://www.airproducts.co.uk/industries/Food on Jan. 19, 2016, 6 pages.
"Impingement Freezer. The most effect freezer in the industry", The Linde Group, downloaded from http://www.lindeus.com/internet.lg.lg.usa/en/images/Impingement-Freezer-2013138_54409.pdf?v=2.0 on Apr. 21, 2017, 2 pages.
Japan, "Butter Stick", Jun. 28, 2018, 1 page.
PCT, "International Search Report and Written Opinion", App. No. PCT/US2019/047534, Dec. 23, 2019, 10 pages.
Clay King, "North Star Dies", www.clay-king.com/clay_extruders/north_star_dies.html, Apr. 1, 2013, 1 page.

(56) References Cited

OTHER PUBLICATIONS

Clextral, "Dies", www.clextral.com/technologies-and-lines/equipment/the-die/, Oct. 29, 2013, 1 page.
Marjon Ceramics, "Extruder", www.marjonceramics.com/pages/Product/EXTRUDERS.html, Oct. 6, 2011, 1 page.

* cited by examiner

100

```
┌─────────────────────────────────┐
│ Adding unformed butter to an    │
│ extruder, wherein the extruder  │─── 110
│ shapes the butter into defined  │
│ cross-sectional dimensions      │
└─────────────────────────────────┘
              │
              ▼
┌─────────────────────────────────┐
│ Cutting the extruded butter at a│
│ desired length to form butter   │─── 112
│ sticks                          │
└─────────────────────────────────┘
              │
              ▼
┌─────────────────────────────────┐
│ Cooling the butter sticks       │─── 114
└─────────────────────────────────┘
              │
              ▼
┌─────────────────────────────────┐
│ Flow-wrapping the cooled butter │─── 116
│ sticks within an adhesive film  │
└─────────────────────────────────┘
```

BUTTER PRODUCTS AND METHODS OF FORMING AND PACKAGING SAME

CROSS-REFERENCE TO RELATED APPLICATIONS

This application claims benefit of U.S. provisional application No. 62/299,350 filed on Feb. 24, 2016, the contents of which are incorporated herein by reference.

TECHNICAL FIELD

Implementations are directed to butter products and methods of manufacturing and packaging such products. More particularly, implementations provide methods of extruding, cooling and flow-wrapping butter products to be sold to consumers.

BACKGROUND

Butter preparation methods represent some of the oldest techniques for utilizing fat components found in milk. Butter manufacture has been accomplished in one form or another for over 4500 years. Over the centuries, butter has been used in sacrificial worship ceremonies, for medicinal and cosmetic purposes, and as a human food.

Today, a wide variety of butter products are available, ranging from traditional butter, reduced fat butter and margarine, to compound butter (i.e., honey butter, cinnamon sugar butter, garlic butter and others). While the diversity of butter products has expanded considerably, the form of butter and its packaging have not. Most recognizably, the butter stick, wrapped in wax-coated paper wrap, remains one of the most common forms of butter sold to consumers. As such, the stick shape serves as an identifier of the product itself.

Provided herein are improved methods of forming and wrapping butter sticks.

SUMMARY

Implementations provide methods of packaging butter sticks that involve adding unformed butter to an extruder, where the extruder shapes the butter into defined dimensions. Implementations further involve cutting the extruded butter at a desired length to form sticks, cooling the butter sticks, and flow-wrapping the cooled butter sticks within an adhesive film.

In various implementations and alternatives, the unformed butter may be fresh churned butter, blocks of bulk butter, piped butter, and/or micro-fixed butter.

In addition or alternatively, the unformed butter may be between about 35° F. and about 75° F.

In various implementations and alternatives, the butter sticks may be cryogenically cooled in a cooling tunnel. In addition or alternatively, the butter sticks may be cooled using an impingement freezer.

In various implementations and alternatives, the butter sticks may be cooled to between about 35° F. and about 55° F.

In addition or alternatively, the cooled butter sticks may include a cooled crust. Alternatively, the cooled butter sticks may be uniformly firm throughout the entire thickness of the stick.

In various implementations and alternatives, the butter sticks may be packaged within a temperature variation spanning about 15° F. to about 30° F.

In addition or alternatively, the adhesive film may include a patterned adhesive. In addition or alternatively, the adhesive film may be oriented and/or re-sealable. In various implementations and alternatives, the adhesive film may include cold seal adhesives.

In various implementations and alternatives, the extruder may include a jacketed, temperature-controlled die.

In various implementations and alternatives, the temperature of the cooled butter sticks may continue to decrease after cooling the butter sticks. In some examples, the temperature may decrease to between about 30° F. and about 45° F. In some embodiments, cooling the butter sticks may comprise cooling an exterior of the butter sticks, where an exterior butter stick temperature equilibrates with an interior butter stick temperature after cooling is complete.

In additional embodiments, a method for continuous packaging butter sticks involves: extruding butter using an extruder; cutting the extruded butter to form butter sticks; continuously transferring the butter sticks to a cooling device for cooling; cooling the continuously transferred butter sticks; continuously delivering the cooled butter sticks to a flow-wrapper; and flow-wrapping the cooled butter sticks within an adhesive film.

Additional implementations provide systems for packaging butter sticks that involve an extruder, a cutting device, a cooling device and a flow-wrapping device, where the extruder shapes unformed butter into defined dimensions, the cutting device slices the extruded butter into butter sticks, the cooling device increases a firmness level of the butter sticks, and the flow-wrapping device packages the butter sticks within a sealed, adhesive film. The extruder, the cutting device, the cooling device and the flow-wrapping device may be connected.

In various implementations and alternatives, the extruder, the cutting device, the cooling device and the flow-wrapping device may be connected by one or more conveyor belts.

In addition or alternatively, the cutting device may be attached to the extruder.

In various implementations and alternatives, the cooling device may include a cryogenic cooling tunnel and/or an impingement freezer. In addition or alternatively, the extruder may include a jacketed, temperature-controlled die.

In various implementations and alternatives, the system also includes a feedback control mechanism.

DETAILED DESCRIPTION

Despite the popularity of butter sticks, Applicant realized that these remain a product of inefficient, inflexible and wasteful manufacturing techniques. In addition, preserving freshness and enabling ease of access for consumers are observed as lingering packaging challenges for the current butter stick. To help ensure that the effectiveness of manufacturing and packaging butter sticks is commensurate with their widespread popularity, the improved methods of forming and wrapping butter sticks are provided herein.

In prior approaches, butter sticks were offered in several different sizes, but the variations were limited. For example, butter sticks were predominantly sold as rectangular blocks of nearly equal width and height. Consistently-sized butter sticks are commonly produced by dosing malleable butter at a specific temperature into pre-formed rectangular cells lined with a film used to wrap the butter. The films are then folded, but not sealed, around the dosed butter, resulting in fully wrapped butter sticks. This traditional method of processing and packaging butter sticks lacks flexibility and is vulnerable to small variations in butter temperature. For example, butter cannot be dosed into the pre-formed cells if it is too cold, and excessively warm butter leads to smearing. Even butter formed at proper temperatures needs to be immediately placed into cartons to avoid losing its stick shape. In addition, the pre-formed rectangular cells cannot be modified, resulting in a lack of design flexibility for butter sticks. Incompatibility with the constraints imposed by the formation and packaging process results in waste. In addition, the film used to package the butter is not sealed, easily exposing the butter to contaminants present in the air and on all surfaces. These unsealed wrappers often become greasy and messy after opening, especially when the enclosed butter becomes soft. Improved methods of forming and wrapping butter sticks are therefore desirable to increase manufacturing efficiency and flexibility, increase ease of access and handling, and also protect consumer health.

Applicant's discovery of improved methods and systems for processing and packaging butter products is the surprising result of experimenting with various manufacturing processes and introducing substantial modifications thereto. Applicant recognized that butter processing poses unique challenges due to the substantial changes in the physical properties of butter that result from only modest changes in temperature. Applicant also understood that the tendency of butter to readily absorb surrounding aromas necessitates special techniques for wrapping butter products. Accordingly, Applicant endeavored to develop new methods and systems of processing and packaging butter sticks that are adaptive to a broad range of input butter temperatures and safe for human consumption.

Provided herein are butter sticks, methods of forming such butter sticks, and methods of packaging such butter sticks. Processing methods accommodate bulk-produced butter at a broader range of temperatures and firmness levels compared to prior approaches, resulting in greater manufacturing flexibility and reduced waste. As provided herein, extrusion processes are utilized to receive large volumes of butter in various malleable or semi-solid states and transform them into either precisely-shaped butter sticks of consistent size (e.g., length, width and height), weight and density, or butter sticks with a selected size (e.g., a selected length, width and/or height). Intense cooling of the extruded butter sticks immediately after and/or during extrusion sufficiently hardens the sticks so that they may endure the packaging process without compromising their classic stick shape. Flow-wrapping the final butter sticks in packaging film comprised of patterned adhesives ensures that the butter remains sealed and protected from the absorption of unwanted particulates. The extruder, cooling device and flow-wrapping device together form an integrated system for packaging butter sticks. By extruding, cooling and flow-wrapping butter sticks in a continuous or semi-continuous process, the methods herein increase manufacturing flexibility while minimizing waste, and provide fresh, protected sticks of butter for human consumption.

Butter Stick Compositions

The butter processed and packaged according to the methods herein may be used in applications such as the preparation of frostings, in baking items and cooking. The butter may be formed from a starting composition comprising about 80 percent fat, 16 percent moisture, as well as protein, lactose, ash, optionally salt, sugar or other dairy-based compositions. In some implementations, the butter may comprise a variety of components that may include but are not limited to: plastic cream, sweet cream, milk, buttermilk, hydrocolloids (e.g., gums), fats, oils, flavorings, spices, seasonings, and/or emulsifiers. Some embodiments may include blends of butter and oil, each in varying amounts. For example, butter compositions may include an amount of canola oil or olive oil, although other oils may also be included. For instance, a butter product of the methods herein may contain about 85-90 wt % fat blend with about 60-70 wt % butter formed of about 80 wt % fat derived from cream that is blended with about 30-40 wt % canola oil formed of 100 wt % oil (fat). In another example, the butter product of the methods herein may contain over 90 wt % fat derived from cream, such as brown butter.

In additional or alternative embodiments, reduced-fat butter, low fat butter and/or butter substitutes, e.g., margarine, may also be processed and packaged according to the methods herein. These products may contain fat concentrations of less than 80 weight percent. For instance, reduced-fat butter containing about 60 weight percent milkfat, or less; and low fat butter containing about 10 to about 40 weight percent milkfat, or less, may also be used in connection with the production processes of the present disclosure.

In some examples, the butter may have a fat content greater than 80 weight percent. For instance, some butter compositions, e.g., brown butter, may include a fat content ranging from about 80 to about 99 weight percent, about 90 to about 99 weight percent, about 95 to about 98 weight percent, or about 97 to about 98 weight percent fat.

Typically, during the butter manufacturing process, whole milk may be separated into cream and skim milk. The cream portion (which may be 20-40 percent fat) may then be churned to make butter. The butter may be supplemented with additional ingredients, listed above, for flavor and/or preservation.

Extruding the Butter Sticks

An extrusion process may be used to convert unformed batches of input butter, often prepared in bulk, into discrete units of butter product having defined shapes of much smaller size. The extrusion device used for product formation may be a standard extruder used for food processing. In some embodiments, the extruder may be a Vemag® model extruder. The input butter fill rate of the extruder may vary depending on the desired output levels, the form of input butter used, and/or the specific extruder model used.

Various forms of input butter may be used. Bulk volumes of input butter may comprise freshly-churned butter or blocks weighing, for example, about 40 to about 70 pounds, about 45 to about 65 pounds, about 50 to about 60 pounds, about 53 to about 57 pounds, or about 54 to about 56 pounds.

In some implementations, the butter may be pre-treated prior to addition to the extruder. For example, an auger/stuffer device may be used to break apart the butter blocks and/or soften the butter to make it pumpable such that a positive pump of the auger/stuffer is able to pump the butter from the device via a 1-2 inch diameter feed pipe, which may reduce back pressure that could otherwise produce voids in the pumped butter. In some examples, the feed pipe may be chilled. Chilling the feed pipe may bestow additional form or body to the butter, especially if the source butter is churned or a is a blended fat containing oil, for instance. The pre-treated, pumped butter exiting the device may fall into an extruder hopper or infeed apparatus as a substantially continuous rope. As the butter collects in the hopper/infeed apparatus, a softened butter mass may cover and fill the extruder ingress from the hopper/infeed apparatus. It has been discovered that the continuous delivery of the softened, pumped butter and its orientation within both the hopper/infeed apparatus and the extruder ingress facilitates preventing the butter from forming voids during extrusion as well as maintaining a vacuum within the extruder, which further prevents the formation of voids. This approach to pretreating the butter is in contrast to adding large butter cubes (e.g., 25 kilograms), or cubes that have been broken apart, into the hopper, which can result in pieces of butter bridging over the extruder ingress to lose vacuum and form voids. Micro-fix machinery may also be used to heat the blocks of bulk butter to a workable temperature and agitate the butter to a malleable state using a rotating twin-screw. The micro-fix machinery may use a cutter-type head that breaks up the butter block and softens the butter. In additional embodiments, shredded butter pieces may be used. Butter in churned, block, micro-fixed, piped (e.g., pumped), shredded or other states may be fed into an extruder for processing to portion and form the butter into defined shapes, e.g., sticks.

The mechanisms and/or structural components implemented to guide and/or feed the butter into the extruder may vary. In some embodiments, the structural components may be formed integrally with the extruder or coupled thereto. For example, a hopper attached to or formed integrally with the extruder may receive the input butter and channel it downward into a co-rotating, twin-screw positive displacement device. In some examples, the hopper may be coupled with one or more direct infeed apparatuses configured to feed the butter into the hopper. In operation, an infeed apparatus may serve as an adapter, linking the hopper to separate butter forming machinery and/or reservoirs such that the butter is fed directly into the hopper and exposure of the butter to the atmosphere outside the extruder and other processing equipment is reduced. In various examples, the infeed apparatus may be coupled with equipment used to make the butter, thereby connecting the butter production equipment with the shaping/packaging equipment. In some examples, the infeed apparatus may be coupled with one or more reservoirs into which unformed butter is deposited. The particular structural components implemented to facilitate the addition of butter into the extruder may vary and may depend in some examples on the proximity of the extruder to machinery configured to perform other processing functions. In some implementations, the infeed apparatus coupled with the hopper may include one or more internal components configured to reversibly open and close, e.g., by sliding, thereby providing a mechanism for controlling the timing and/or amount of butter fed into the extruder. In some embodiments, the hopper may be replaced with an infeed apparatus configured to shuttle the butter into the extruder. Elimination of the hopper may improve cleaning operations, for example by reducing the total amount of cleaning necessary. Implementation of a direct infeed apparatus, either in addition to or instead of a hopper, may also maintain and/or modify the butter to an acceptable condition for the extruder.

The temperature of the input butter may vary depending on its physical state, i.e., block butter may be significantly cooler, and thus more firm, than churned or micro-fixed butter. The range of acceptable temperatures for the input butter used according to the methods herein may be broader than the range amenable to pre-existing approaches. For example, prior approaches to forming butter into defined shapes, such as sticks, often involved dosing highly malleable butter into rigid, pre-defined forming cells. Under this approach, maintaining the butter within a narrow temperature range is critical to ensuring that it is properly dosed into the forming cells. In particular, butter exceeding the acceptable temperature range may be prone to smearing, and butter falling below the acceptable range may be too firm for dosing. Each of these problems creates inefficiency and waste by forcing manufacturers to pause production and/or discard butter that falls outside the narrow range of tolerable temperatures. By enabling the utilization of more varieties of input butter at various temperatures and physical states, the presently disclosed methods therefore reduce the waste that often accompanies pre-existing approaches. In some embodiments, the temperature of the input butter used according to the methods herein may range from about 30° F. to about 80° F., about 35° F. to about 75° F., about 40° F. to about 70° F., about 40° F. to about 60° F., about 50° F. to about 70° F., or about 50° F. to about 60° F.

After passing through the hopper and/or infeed apparatus, the butter may be received by a twin-screw positive displacement device, which may agitate, portion, and urge the butter through the extruder barrel. The twin-screw device may also exert a compacting pressure on the butter, eliminating air pockets and compressing the butter to a desired density and uniform consistency as it is driven through the extruder barrel. In some examples, the twin-screw device may be customized specifically for butter processing. For instance, the twin-screw device may be appropriately scaled to a produce smaller butter piece size in order to deliver appropriately-sized butter pieces to the extruder die. The twin-screw device may include a spiral-shaped stopper component configured to urge butter from the hopper/infeed apparatus down into a throat portion defined by the extruder, which may be vacuum pressurized. The spiral-shaped stopper may be configured to force butter from the hopper into the vacuum-pressurized portion of the extruder more effectively than differently-shaped stopper components, e.g., spade-shaped stopper components.

To attain a level of malleability suitable for forming the butter into distinct shapes, the extruder may alter the temperature of the butter to varying degrees. The extent of the temperature change may depend on the specific butter composition and/or temperature of the butter upon addition to the extruder. For example, block butter may require heating to reduce firmness, while fresh churned butter may require cooling to reach a less pliable state. Additionally, the inclusion of oil with the butter in a fat blend, especially in high amounts, may necessitate cooling to increase the viscosity of the butter-oil mixture. In some embodiments, the extruder may increase the butter temperature by about 0.1° F. to about 10° F., about 0.1° F. to about 5° F., or about 0.1° F. to about 3° F. In other embodiments, the extruder may decrease the butter temperature by about 0.1° F. to about 10° F., about 0.1° F. to about 5° F., or about 0.1° F. to about 3° F. After an initial adjustment in some embodiments, the extruder may maintain the butter at an approximately constant temperature within the extruder. Attaining and maintaining an appropriate temperature within the extruder may prevent melting the butter, at high temperatures, or causing water loss from the butter at low temperatures, and/or creating voids in the butter. For example, the range of acceptable butter temperatures within the extruder may reduce the level of water expulsion that may occur when the screw device, under pressure, squeezes water out of the butter during extrusion, a phenomenon more likely to occur as the temperature of the butter decreases. In various embodiments, the temperature of the butter within the extruder may range from about 20° F. to about 85° F., about 25° F. to about 75° F., about 30° F. to about 75° F., about 35° F. to about 75° F., about 20° F. to about 30° F., about 20° F. to about 32° F., about 20° F. to about 40° F., about 20° F. to about 50° F., about 20° F. to about 60° F., about 45° F. to about 75° F., about 55° F. to about 75° F., about 60° F. to about 75° F., about 68° F. to about 75° F., about 45° F. to about 60° F., about 45° F. to about 55° F., about 45° F. to about 53° F., about 50° F. to about 58° F., about 53° F. to about 57° F., or about 54° F. to about 56° F.

Once it reaches the end of the extruder barrel, the twin-screw continues to push the compacted butter until it is forced through a forming die, also referred to as a former, with a defined opening of desired dimensions, effectively shaping the butter into sticks. The length of the forming die may vary. In some embodiments, the forming die may be elongated to increase the residence time of the butter within the die. For instance, the egress of the former may have a configuration for eliminating voids or preventing void formation in the butter, with a length that may range from about 4 to about 12 inches, or about 8 to about 12 inches in examples. The forming die may be maintained at an ambient temperature. Alternatively, the forming die may be temperature-controlled. Temperature-controlling the die, such as by applying heat, may facilitate reducing friction within the die, whereas cooling may facilitate forming a more firm extrusion. As it emerges through the forming die, the nascent butter may comprise a continuous, rope-like mass of consistent height and width, as defined by the die opening. The cross-sectional shape of the forming die, and thus the butter sticks emerging therefrom, may vary. In some embodiments, a forming die defining a cross sectional opening that is wider than taller may be implemented. Such cross sectional dimensions, i.e., more wide than tall, may be implemented to improve downstream processing of the butter. For example, sticks which are more wide than tall may cool more rapidly than sticks having other dimensions, e.g., square or more tall than wide. The sticks may also be more amendable to flow wrapping, especially during the creation of end seals and/or when drawing a vacuum within each wrapper to eliminate air pockets. In some examples, a single butter stick may be twice as wide as the stick is tall, such as about 1.125 inches wide and about 0.625 inches tall. In some embodiments, the height and width dimensions may be equal. Whether equally or differently sized, the height and/or width of each butter stick may range from about 0.40 to about 1.75 inches, about 0.50 to about 1.65 inches, about 0.95 to about 1.55 inches, about 0.50 to about 0.70 inches, about 0.55 to about 0.65 inches, about 0.9 to about 1.4 inches, or about 1.4 to about 1.6 inches. In additional or alternative embodiments, the height and/or width dimension of the former may be about 0.625 inches. The dimensions of the former egress may be decreased to 0.625 inches, for example, to increase the surface-area-to-volume ratio of each butter stick exiting therefrom, thereby enhancing the effectiveness of techniques used to cool each butter stick. In some examples, the portion of the die contacting the butter may be stainless steel.

In some embodiments, multiple butter sticks may be extruded simultaneously from the same extruder. According to such embodiments, the forming die may define multiple openings. Once the butter reaches the end of the extruder barrel, it may be extruded through each opening simultaneously. In addition or alternatively, a multi-lane extruder may be used, in which the butter is portioned into multiple lanes within the extruder barrel, and each lane is fed into a separate forming die. Use of a multi-lane extruder may be necessary for achieving an increased rate of production. The number of concurrently extruded butter sticks may vary, ranging from about two to about 30, about two to about eight, about two to about six, about two to about four, about 16 to about 28, about 20 to about 26, or about 22 to about 24 butter sticks. Simultaneous extrusion of multiple butter sticks may enable a single extruder to extrude, for example, about 44,000 butter sticks per hour, although faster or slower rates of extrusion are attainable using the methods and systems described herein. For example, the hourly rate of butter stick extrusion may range from less than about 10,000 sticks per hour to greater than 75,000 sticks per hour, or about 10,000 to about 75,000 sticks per hour, about 20,000 to about 60,000 sticks per hour, or about 30,000 to about 50,000 sticks per hour in various embodiments.

In embodiments, the butter may be forced from the extruder at the same or similar temperature as the butter temperature while inside the extruder. The butter may also be extruded at a temperature range that is wider than the processing temperatures applied to butter during other formation processes from prior approaches, e.g., dosing in predefined cells. The broader range of acceptable extrusion temperatures may be attributed, at least in part, to the continuity of the formation process disclosed herein, the time intervals between discrete processing steps, and/or the parameters, e.g., compacting pressures and/or temperatures, of each processing step. For instance, by immediately and/or drastically cooling the butter after extrusion, the butter may be extruded at greater temperatures than might otherwise be possible for producing butter products having a defined shape, e.g., a stick. In some examples, the wider temperature range may also increase butter throughput by reducing the time that may otherwise be necessary to adjust the temperature of the butter to a workable level for processing. In some examples, the butter temperature upon extrusion at the forming die may be at least about 50° F., a temperature which has been discovered to be more conducive to void-free butter extrusion. In other examples, such as those involving butter-oil mixtures, the butter temperature upon extrusion may be at least about 25° F. to ensure that the nascent butter maintains the form defined by the die. In still other examples, such as those involving high-fat content butter compositions, e.g., brown butter having a fat content of about 95 to about 98 weight percent, the butter temperature upon extrusion may be at least about 70° F. Embodiments involving butter-oil mixtures that also have a high fat content may still necessitate relatively low extrusion temperatures, e.g. about 25° F. to about 40° F., to account for the fluidity imparted on the butter by the oil, which may have a greater impact on malleability of the butter than its total fat content. In various embodiments, the temperature of the butter upon extrusion at the forming die may range from about 20° F. to about 85° F., about 25° F. to about 75° F., about 20° F. to about 32° F., about 25° F. to about 32° F., about 26° F. to about 30° F., about 20° F. to about 40° F., about 20° F. to about 50° F., about 20° F. to about 60° F., about 30° F. to about 75° F., about 35° F. to about 75° F., about 45° F. to about 75° F., about 50° F. to about 75° F., about 55° F. to about 75° F., about 60° F. to about 75° F., about 68° F. to about 75° F., about 70° F. to about 85° F., about 75° F. to about 85° F., about 80° F. to about 85° F., about 45° F. to about 60° F., about 50° F. to about 60° F., about 45° F. to about 55° F., about 45° F. to about 53° F., about 50° F. to about 58° F., about 53° F. to about 57° F., or about 54° F. to about 56° F. Acceptable temperatures of the butter at the forming die may vary depending on the geometry of the butter upon extrusion. Smaller and/or more narrow butter sticks may be extruded at lower temperatures, for example.

In some embodiments, the butter may be maintained as a continuous, rope-like mass for later cutting at predetermined lengths. In other embodiments, the butter may be sliced at predetermined lengths as it emerges from the extruder die. The length may vary depending on the manufacturer or the specific product. In some embodiments, the butter may be sliced at a length of about 2.75 to about 5.25 inches, about 2.85 to about 5.15 inches, about 2.95 to about 5.05 inches, about 2.9 to about 3.2 inches, or about 4.7 to about 5.1 inches to form butter sticks. Various cutting techniques and/or devices may be used to slice the butter at the aforementioned lengths. In some embodiments, a cutting wire may be implemented to slice the butter in repetitive fashion. For example, a single-pass cutting wire may be configured to slice the butter in an upward direction and a downward direction. In operation, the extruder may extrude butter through the opening defined by the forming die. As the butter emerges from the die, the cutting wire may slice the butter vertically, extending through the entire width of the butter stick to form a butter stick end. Depending on the direction of the first slice, e.g., up or down, the cutting wire may remain either above or below the butter stick as it continues to emerge from the die. After a selected butter stick length emerges from the die, the cutting wire may then slice the stick vertically in a direction opposite the first slice, again extending through the entire width of the butter stick, thus separating a fully-formed butter stick from the continuous rope of butter passing through the extruder. By making quick, unidirectional slices in the butter as it emerges from the die, single-pass cutting wires may slice the butter at predefined lengths without interrupting and/or slowing the operational flow speed of the extruder. In some embodiments, such as those involving the simultaneous extrusion of multiple butter sticks, multiple cutting wires may be utilized such that, for example, each nascent butter stick is sliced by a different wire. In addition or alternatively, ultrasonic and/or water-knife cutting techniques may be employed to slice the butter. Such embodiments may reduce deformation of the butter sticks by decreasing the amount of friction between the cutting device and the butter.

In alternative embodiments, the extruded butter may be formed into various shapes by using different die shapes and/or altering the predetermined lengths at which the extruded butter is sliced. In some examples, the butter stick length may be adjustable in substantially real time, such that operation of the extruder does not require pausing for adjustments. Modifications to the butter stick shape and/or size may be implemented via an external controller, e.g., a computer.

Whether cut at predetermined lengths or still comprised of a continuous mass, the butter may be cooled within the extruder, for instance, within the die, and/or as it emerges from the extruder, for instance, prior to the more intensive cooling processes disclosed herein. In some embodiments, the butter may be cooled as closely as possible to the target temperature of the impending cooling step to avoid undesirable consequences associated with exposing the butter to an immediate, drastic temperature drop. Potential consequences may include dehydration, uneven cooling, and/or superficial cooling.

In some embodiments, one or more markings may be printed directly on each butter stick after extrusion. For example, food-grade ink may be applied to one or more locations on the exterior of each butter stick. In some examples, the markings may be measurement markings, e.g., tablespoon markings. An inkjet printer may be configured to apply such markings in some embodiments. In addition or alternatively, markings may be de-bossed onto the exterior of each butter stick.

Cooling the Butter Sticks

After compaction in the extruder, the butter may remain too malleable and impressionable to be packaged effectively while still retaining its desired shape and dimensions. To increase the firmness of the butter, it may be subjected to cooling during and/or following extrusion. Consequently, cooling may be performed using the extruder and/or using machinery separate from the extruder. For instance, the extruder die, or a portion thereof, may be jacketed and used to cool the compacted butter or another device may be used to cool the extruder die. When a separate cooling device is used, such as a cooling tunnel, the butter may be transferred to the cooling device using a conveyor belt. In embodiments, the use of a conveyor belt to transfer the extruded butter sticks from the extruder to the cooling device may allow the butter sticks to be transferred between the two components in a continuous or semi-continuous manner without the need for manual intervention, e.g., to organize or transfer the sticks. The length of the conveyor belt may vary in different embodiments, and may depend on the rate of extrusion and/or the number of butter sticks concurrently extruded from the extruder. For instance, longer conveyor belts, e.g., greater than 20 feet, may be appropriate for embodiments involving concurrent extrusion of multiple butter sticks from the same extruder. Depending on the dimensions of the forming die, the width of the conveyor belt may also vary, ranging from about 30 to about 50 inches, or about 35 to about 45 inches in embodiments.

The butter sticks may be cooled chemically and/or mechanically. Chemical cooling techniques may comprise cryogenically cooling the butter using, for example, liquid nitrogen. In some embodiments, liquid nitrogen may be applied to a cooling tunnel to cool the butter sticks as they travel down a conveyor belt housed within the cooling tunnel. Butter sticks cooled according to such methods may not directly contact the liquid nitrogen. Instead, liquid nitrogen and nitrogen gas may be used to rapidly chill the air within the tunnel, which may be circulated by fans also positioned within the tunnel. To provide uniform cooling on all surfaces of the butter sticks, the cooling tunnel may circulate cryogenically-cooled air both above and underneath the sticks. In some embodiments, the conveyor belt may be grated to directly expose the butter sticks to chilled air circulating underneath. Use of the cooling tunnel may minimize the time needed to cool the butter sticks to the desired temperature. Retention time within the tunnel may vary depending on the speed of the conveyor system, the size of the nitrogen tunnel, the density of butter sticks on the conveyor belt and/or the thickness of the butter sticks. In some embodiments, retention time within the nitrogen cooling tunnel may range from about 0.1 to about 10 minutes. In specific embodiments, the dwell time of the sticks in the cooling tunnel may be about four minutes per stick. The cooling temperatures employed within the cooling tunnel may also vary. In some embodiments, the cooling temperature may be inversely related to the dwell time. For example, the cooling temperatures may be reduced to accommodate faster rates of butter stick production, and thus decreased dwell time within the cooling device. In various embodiments, the cooling temperature applied to the butter may range from about $-70°$ F. to about $-140°$ F., about $-80°$ F. to about $-130°$ F., about $-90°$ F. to about $-120°$ F., or about $-100°$ F. to about $-110°$ F.

Mechanical cooling methods may comprise impingement freezing, which quickly cools the butter by exposing it to cold air at high velocities. The impingement freezer may resemble a tunnel with open or closed ends. Various refrigerants may be used to generate the cold temperatures within the freezer, and high-velocity jets positioned with the freezer may be used to inject the cold, fast-moving air. In some embodiments, a conveyor system may be used to move the butter sticks through the impingement freezer. The high-velocity jets may be positioned above and/or below the butter sticks to ensure even cooling. In some embodiments, the conveyor system may be paused as necessary to ensure adequate cooling. Retention time within the impingement freezer may vary depending on the size of the freezer, the speed of the conveyor system, the density of butter sticks on the conveyor belt and/or the thickness of the butter sticks. In some embodiments, retention time within the freezer may range from about 0.1 to about 10 minutes.

Cooling temperatures may decrease and/or retention times may increase with increases in butter thickness. For example, butter sticks that are short and thick may require more cooling than butter sticks that are longer but more narrow. Sufficient cooling may be especially important at the ends of each butter stick, where contact and pressure incidental to flow-wrapping may be the greatest, for example, during sealing of the wrapper at the stick ends. Accordingly, the stick ends may be cooled during the cooling process, for example, by increasing the spacing between sticks conveyed through the cooling system to accommodate greater air flow at the ends of each stick. Effectively spacing the sticks may be accomplished by using flighted conveyors that maintain a consistent distance between each butter stick. The flight distance may be adjusted for butter sticks of different lengths.

The temperature of the butter immediately after cooling may vary. For example, in some embodiments the butter may be about 20° F. to about 45° F., about 25° F. to about 35° F., about 35° F. to about 45° F., about 37° F. to about 43° F., or about 39° F. to about 41° F. after cooling. In some examples, the butter temperature immediately after cooling may vary at different positions within each butter stick, such that certain portions of the butter stick are cooler than others. In embodiments, cooler localized temperatures may coincide with greater direct exposure to cooling conditions. For example, the center of each butter stick, not directly exposed to cooling conditions during the cooling process, may remain at an approximately constant temperature during and immediately following cooling as it was when it entered the cooling device. In some examples, an interior temperature near the butter stick center may drop about 2° F. to about 10° F. during the cooling process, reaching post-cooling temperatures ranging from about 18° F. to about 73° F., about 35° F. to about 65° F., about 45° F. to about 55° F., about 47° F. to about 53° F., or about 48° F. to about 51° F. (as measured from a digital temperature probe inserted into the center or core of the stick). The concurrent post-cooling temperature at or near the butter stick exterior portions, which may be directly exposed to cooling conditions during the cooling process, may drop about 45° F. to about 100° F., reaching temperatures of about 0° F. to about −10° F., about −2° F. to about −8° F., or about −4° F. to about −6° F. (as measured using an Infrared gun). The aforementioned temperature drops may be greater for longer residence times and/or reduced cooling temperatures.

In some examples, the temperature of the butter stick interior, e.g., core, and the butter stick exterior may equilibrate after active cooling is complete, i.e., after leaving the cooling tunnel or device. More specifically, the butter stick exterior may continue to cool the butter stick core even after the cooling process is complete, eventually reaching an equilibrated, uniform temperature. The length of time required to reach the equilibration temperature may vary in embodiments. For example, a colder butter stick exterior may continue to cool a butter stick core for up to about 10 minutes after leaving the cooling tunnel. In various embodiments, the butter stick temperature may not equilibrate until after flow wrapping. Regardless of the specific time-to-equilibration, the butter may reach or at least approach freezing temperatures after leaving the cooling tunnel, such that the butter requires less storage cooling after flow wrapping. Accordingly, the butter stick cores may reach a transportation-ready temperature in a shorter period of time compared to butter sticks prepared using other approaches. The specific equilibration temperature may vary, ranging from about 20° F. to about 35° F., about 30° F. to about 45° F., about 32° F. to about 42° F., about 34° F. to about 40° F., or about 38° F. to about 40° F. in some examples.

By cooling the butter to within the aforementioned temperature ranges, the butter sticks reach a firmness level able to withstand the packaging process without becoming deformed. The measured firmness of the butter may vary depending on the temperature of the butter, the specific composition of the butter, the thickness of the butter stick, and/or the time taken to cool it. In some embodiments, vein readings of firmness may range from about 250,000 to about 450,000 cps. The butter stick temperatures corresponding to this firmness range may vary. For example, firmness levels of about 250,000 cps may coincide with butter temperatures of approximately 45° F., while firmness levels of about 450,000 cps may coincide with butter temperatures of about 35° F. Firmness readings between about 250,000 and about 450,000 cps may coincide with butter temperatures between about 35° F. and about 45° F. Because the interior of each butter stick may remain warmer prior to equilibration, the butter may comprise a cooled crust having elevated firmness at the aforementioned vein readings, with the interior portion of the butter remaining in a relatively warmer, softer state. In such cases, the thickness of the cooled crust may vary, ranging from about 0.01 to about 0.74 inches. Alternatively, the thickness of the crust required to withstand the packaging process may comprise a percentage of the total thickness of the butter stick. For instance, this percentage may range from about 1% to about 49% of the entire thickness of the butter stick. In some examples, the cooled crust may have a firmness level of about 450,000 cps, while the interior core may have a firmness level of about 250,000 cps. In still other embodiments, the cooler temperature may permeate the entire thickness of the butter, giving it a relatively uniform firmness level throughout.

Flow-Wrapping the Butter Sticks

While still at a reduced temperature, the cooled butter sticks may be transferred to a horizontal flow-wrapping device for packaging. A conveyor belt may be used to transfer the butter sticks. In some embodiments, an infeed conveyer belt feeds the cooled butter sticks directly into the flow-wrapping device. In some embodiments, the conveyor belt may be flighted to mechanically push the butter sticks through the flow-wrapping device. In such cases, the flighted pushers may be designed to minimize the likelihood of indenting the surface of each butter stick that contacts the pusher. In some embodiments, an infeed apparatus may be coupled with the flow wrapper. In embodiments, the infeed apparatus may be the only structural component traversed by the butter sticks between the cooling device and the flow wrapper, while in other embodiments, the infeed apparatus may be positioned between an end of a conveyor belt and the flow wrapper. To reduce friction between the surface of the infeed apparatus and the butter sticks, the infeed apparatus may be dimpled, e.g., a dimpled plate that may be made at least in part of steel. In some examples, more than one flow wrapper device may be implemented. Multiple flow wrappers may be necessary to accommodate faster rates of butter stick production. For instance, cooled butter sticks may be apportioned into two flow wrappers to avoid back-up and ensure that all butter sticks are wrapped while still at a sufficiently low temperature. In addition or alternatively, flow-wrapping devices may include multiple lanes to accommodate increased numbers of cooled butter sticks.

The butter stick transition time between exiting the cooling device and entering the flow wrapper may vary. Because a short transition time may be desired, the cooling device may be positioned in close proximity to the flow wrapper. In some examples, the transition time between the two components may be less than one minute, between about 5 and about 50 seconds, about 10 and about 40 seconds, about 15 and about 30 seconds, or about 20 and about 25 seconds. Accordingly, the temperature of each butter stick may not equilibrate prior to reaching the flow wrapper.

Flow-wrapping the butter sticks while they remain within a desired temperature range ensures that the butter maintains a firmness level necessary to withstand the wrapping process. The temperature of the butter during flow-wrapping may vary. In embodiments, the overall temperature of the butter sticks may range from about 20° F. to about 40° F., about 30° F. to about 50° F., about 35° F. to about 45° F., about 37° F. to about 43° F., or about 39° F. to about 41° F. during the flow wrapping process. In some examples, the temperature of the exterior of each stick and the interior may be different at the onset of and/or during flow wrapping, prior to reaching the equilibration point, such that the exterior remains at a reduced temperature relative to the interior. In particular embodiments, the temperature at or near each butter stick exterior during flow wrapping may range from about −10° F. to about 35° F., about −5° F. to about 30° F., about 0° F. to about 25° F., about 5° F. to about 20° F., or about 10° F. to about 15° F. Likewise, the temperature at or near each butter stick core may range from about 25° F. to about 70° F., about 40° F. to about 73° F., about 45° F. to about 65° F., about 50° F. to about 60° F., or about 53° F. to about 57° F. during flow wrapping. In various embodiments, the butter stick core portions may continue to cool while the butter stick exterior portions continue to warm during the flow wrapping process, both portions nearing the equilibration point, such that localized temperatures at the exterior surfaces and near the core are different at the onset of flow wrapping and at the completion of flow wrapping.

The flow-wrapping device may comprise a film feed assembly with a film roll stock loaded onto a roll. The film may comprise a variety of components, e.g., polypropylene. The film may comprise patterned adhesives that enable sealing of the butter sticks at predefined points. Because butter is prone to the absorption of external aromas and flavors, the patterned adhesives may be positioned along the film so as to prevent the adhesives from contacting the butter. In addition or alternatively, the adhesives may be specially formulated to prevent the transfer of adhesive flavor to the butter.

As the butter sticks are conveyed through the film feed assembly, packaging film is unwinding from a roll. A forming apparatus guides the unwinding film around the sticks to envelop them. By bringing the two edges of the film together and compressing the edges along the length of each butter stick, the patterned adhesives are aligned and a fin seal is formed. A fin seal is comprised of edges of superimposed films bonded together, generating a fin-like protuberance. In implementations, cold seal adhesives may be employed to bind the film edges together without applying heat, further minimizing the likelihood of butter melting and/or malformation. In such cases, small amounts of pressure may be applied at the patterned adhesion points for a short amount of dwell time to fully bind two film surfaces together. In other embodiments, sealing may require a low amount of intermittent heat to bind the adhesives together at points of desired sealing. For example, a localized temperature increase ranging from about 5° F. to about 15° F., about 7° F. to about 13° F., or about 9° F. to about 11° F. may be necessary to create a seal. These temperature increases may be increases from ambient temperatures, e.g., about 60° F. to about 90° F.

After fin sealing, the film surrounding each stick may remain connected to the film roll stock, forming an elongated film tube that contains multiple, evenly-spaced sticks. To separate the sticks into individually-wrapped packages, the film is separated into segments, e.g., by cutting, and may be sealed along the ends of each stick. Mechanical jaws attached to the flow-wrapping device compress the film near the edges of each stick, bringing together the adhesives present on opposing surfaces of the film. By compressing the surfaces together for a short dwell time, the film may be sealed at the ends. During creation of each end seal, a vacuum may be applied to remove excess air from the inside of each wrapped stick of butter and/or to remove any air pockets that may form within the end seals. The size of the end seals, e.g., the distance by which the end seals protrude outwardly from the butter stick, may vary in embodiments. In some examples, the flatter the cross sectional shape of the butter stick, the less the end seals protrude. In some embodiments, cold seal adhesives are also used at this step of generating end seals to avoid the application of heat. The mechanical jaws may also comprise one or more blades that cut the bonded film at the midpoint of each seal, effectively separating consecutively-wrapped butter sticks. Various head space manipulation techniques may also be implemented to improve secondary packaging operations.

In some embodiments, the film may allow for easy tearing of the packaging at a point of use. For instance, an oriented film may be used for this purpose. In addition, the oriented film may be used to avoid deformation of the butter sticks upon cutting using various utensils due to the ability for the film to easily tear. In addition or alternatively, the film may accommodate cutting at specific points along each butter stick and/or measuring labels useful for cooking applications. Some embodiments may comprise peelable and/or re-sealable films that can be repeatedly opened and closed to increase ease of access and maintain freshness levels after use.

After flow wrapping is complete, the butter sticks may continue to cool, such that all portions of each stick may equilibrate to or towards freezing temperatures. As discussed above, dynamic cooling of the butter sticks after the cooling process is complete may be the result of a cold exterior of each butter stick continuing to cool the butter stick core. Such dynamic cooling may vary with different geometries of the butter stick. For example, equilibration temperatures at or near freezing, e.g., to about 32° F., about 30° F. to about 45° F., about 32° F. to about 42° F., about 34° F. to about 40° F., or about 38° F. to about 40° F., may be attained for butter sticks having a greater width than height in some embodiments.

In some embodiments, feedback mechanisms for controlling the rate of butter stick output may be used to coordinate the rate of extrusion, cooling and flow-wrapping. Because the extruder, the cooling device and the flow-wrapping device may be physically connected in one system, such feedback control mechanisms may protect against butter clogging and/or backup by ensuring that each component within the system operates at the same or similar rate. For instance, feedback mechanisms may involve relaying information about the rate of production and/or function of any one of the components within the system to one or more other system components, which then adjust a rate of operation accordingly. In one exemplary embodiment, the flow-wrapping device may alert the extruder of a pause in the flow-wrapping process, signaling the extruder to temporarily halt extrusion to avoid build-up of butter sticks within the system. In other embodiments, build-up of butter at any point in the system may trigger a system-wide shut-down until the problem is resolved and/or the system is reinitiated.

Figure 1:
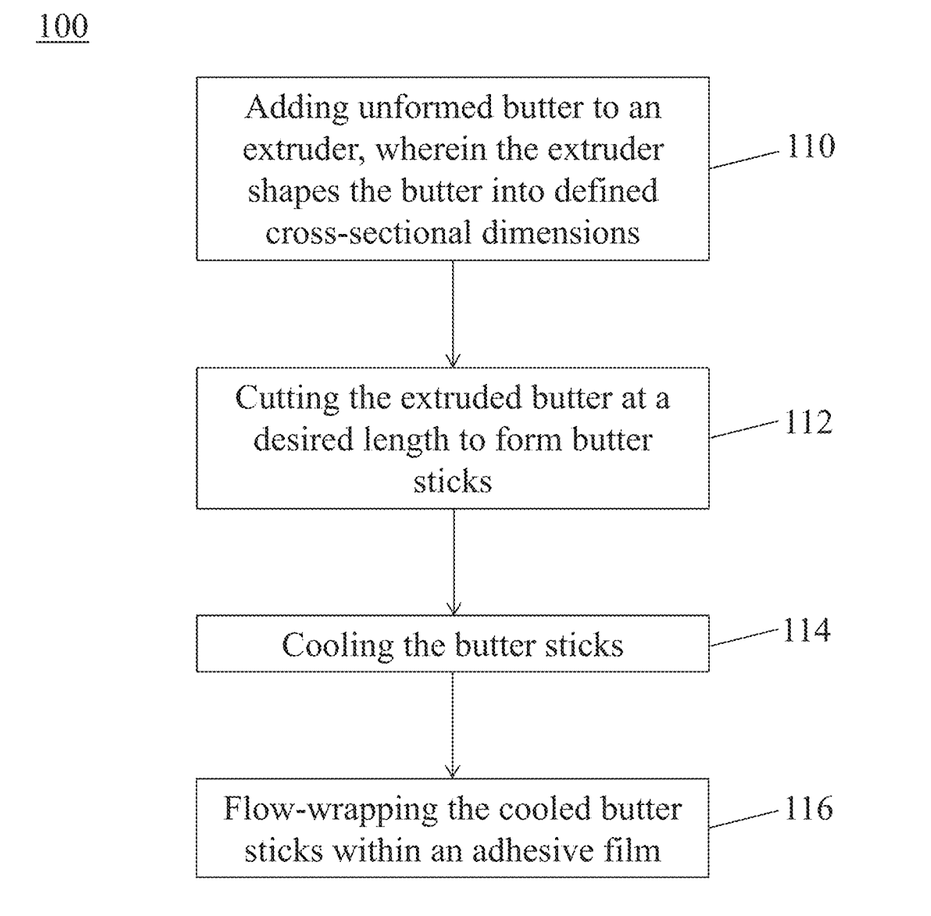
FIG. 1 is a block diagram of a method of packaging butter sticks in accordance with principles of the present disclosure.

FIG. 1 is a block diagram of a method of packaging butter sticks in accordance with principles of the present disclosure. The example method 100 of FIG. 1 shows the steps that may be utilized by the systems and/or apparatuses described herein for extruding, slicing, cooling, and flow-wrapping butter sticks in continuous fashion. In the embodiment shown, the method 100 begins at block 110 by "adding unformed butter to an extruder, wherein the extruder shapes the butter into defined cross-sectional dimensions." The temperature and composition of the butter at this stage may vary. For example, the temperature of the unformed butter may range from about 40° F. to about 70° F. In addition or alternatively, the butter may be mixed with one or more oils, e.g., olive oil or canola oil, such that the mixed composition has a high oil content. In addition or alternatively, the fat content of the butter may vary, ranging from about 80 weight percent up to about 98 weight percent in examples. Variation in the butter properties may necessitate variation in the extrusion parameters. For example, cooler butter may require warming within the extruder to achieve a sufficient level of malleability. By contrast, butter compositions having high oil content may require cooling within the extruder and at the point of extrusion such that the butter maintains a defined shape upon exiting the forming die of the extruder.

At block 112, the method 100 involves "cutting the extruded butter at a desired length to form butter sticks." In some examples, the butter may be sliced using a thin wire cutter. The desired length may vary and may be adjustable by an operator inputting extrusion parameters into a controller communicatively coupled with the extruder. In some examples, the extruded butter may be sliced to form butter sticks ranging from about 2.75 to about 5.25 inches in length.

At block 114, the method 100 involves "cooling the butter sticks." In various embodiments, the butter sticks may be cooled to temperatures ranging from about 35° F. to about 45° F. The cooling temperature may vary to accommodate multiple variables, including the butter composition, the rate of butter stick extrusion, and/or the temperature of the butter sticks upon extrusion. For instance, faster butter stick extrusion rates may necessitate more intense cooling conditions to compensate for reduced dwell time within an extrusion device.

At block 116, the method 100 further involves "flow-wrapping the cooled butter sticks within an adhesive film." In various examples, one or more flow wrapping devices may be utilized to accommodate faster rates of butter stick production. The temperature of the butter sticks upon flow wrapping may range from about 15° F. to about 30° F. in some examples.

In a particular example, a method of packaging butter sticks involves extruding butter from an extruder at about 35° F. to about 75° F. to form a butter extrusion having a width that is at least about twice as wide as a height of the extrusion (e.g., about 1.125 inches wide and about 0.625 inches tall). The butter extrusion may be cut to form butter sticks. The butter extrusion or sticks may be cooled in a cooling environment having a temperature of about −70° F. to about −140° F. A core temperature near the butter stick center may drop about 2° F. to about 10° F. during cooling, while a temperature at the exterior of the butter may drop by about 45° F. to 100° F. After cooling and prior to flow wrapping, the temperature of the butter begins to equilibrate. For instance, the core may have a temperature of about 25° F. to about 73° F., and an exterior of the butter may have a temperature of about 0° F. to about −10° F. During equilibration, the cooled butter is flow wrapped, which involves using an adhesive film to seal the butter within an interior of the film. During flow wrapping, the temperature of each butter stick may range from about −6° F. to about 35° F. at or near the exterior surfaces, and about 40° F. to about 70° F. near the core. After flow wrapping, the temperature of the butter may equilibrate to about 30° F. to about 45° F. The processes of extruding, cooling and flow wrapping may be continuous as provided herein.

As used herein, the term "about" modifying, for example, the quantity of a component in a composition, concentration, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities.

What is claimed is:

1. A method of packaging butter sticks, the method comprising:
   adding unformed butter to an extruder, wherein the butter has a temperature in the extruder of 60° F. to about 75° F., the butter does not melt in the extruder, and the extruder shapes the butter into defined dimensions;
   extruding softened void-free butter having a temperature of at least about 50° F. at a forming die of the extruder;
   cutting the extruded butter as the extruded butter emerges from the extruder at a length of about 4.7 inches to about 5.25 inches to form butter sticks, wherein each of the butter sticks comprises a width of about 0.4 inches to about 1.75 inches;
   cooling the butter sticks in a cooling environment of about −70° F. to about −140° F. such that a temperature of a core of the butter sticks drops by about 2° F. to about 10° F. and an exterior temperature of the butter sticks drops by about 45° F. to about 100° F.; and
   after exiting the cooling environment, flow-wrapping the cooled butter sticks within an adhesive film using a flow-wrapper, wherein a transition time between exiting the cooling environment and entering the flow wrapper is less than one minute such that a temperature of the cooled butter sticks equilibrates during flow-wrapping, and wherein, prior to flow-wrapping, the cooled butter sticks include a crust having a firmness level of about 450,000 cps and the core having a firmness level of about 250,000 cps.

2. The method of claim 1, wherein the unformed butter is between about 40° F. and about 70° F. upon entering the extruder.

3. The method of claim 1, wherein the extruder comprises a jacketed, temperature-controlled die.

4. The method of claim 1, wherein the forming die comprises an egress having a length from about 4 inches to about 12 inches.

5. The method of claim 1, wherein the unformed butter has a temperature of about 30° F. to 80° F. upon entering the extruder.

6. The method of claim 1, wherein a temperature at the exterior of the butter stick during flow-wrapping ranges from about −10° F. to about 35° F., and a temperature at the core of the butter stick during flow-wrapping ranges from about 25° F. to about 70° F.

7. A method for continuous packaging of butter sticks, the method comprising:
  adding unformed butter to an extruder, wherein the butter has a temperature in the extruder of 60° F. to about 75° F., the butter does not melt in the extruder, and the extruder shapes the butter into defined dimensions;
  extruding softened void-free butter having a temperature of at least about 50° F. at a forming die of the extruder;
  cutting the extruded butter as the extruded butter emerges from the extruder at a length of about 4.7 inches to about 5.25 inches to form butter sticks, wherein each of the butter sticks comprises a width of about 0.4 inches to about 1.75 inches;
  continuously transferring the butter sticks to a cooling device for cooling;
  cooling the continuously transferred butter sticks by about 2° F. to about 10° F. at a core of the butter sticks and by about 45° F. to about 100° F. at an exterior of the butter sticks by exposing the butter sticks to a temperature of about −70° F. to about −140° F.;
  continuously delivering the cooled butter sticks from the cooling device to a flow-wrapper; and
  flow-wrapping the cooled butter sticks within an adhesive film while drawing a vacuum within the film using the flow-wrapper, wherein a transition time between exiting the cooling device and entering the flow wrapper is less than one minute such that a temperature of the cooled butter sticks equilibrates during flow-wrapping,
  and
  wherein, prior to flow-wrapping, the cooled butter sticks include a crust having a firmness level of about 450,000 cps and the core having a firmness level of about 250,000 cps.

8. The method of claim 7, wherein the forming die comprises an egress having a length from about 4 inches to about 12 inches.

9. The method of claim 7, wherein a temperature at the exterior of the butter stick during flow-wrapping ranges from about −10° F. to about 35° F., and a temperature at the core of the butter stick during flow-wrapping ranges from about 25° F. to about 70° F.

* * * * *